United States Patent [19]

Furusawa

[11] Patent Number: 5,730,242

[45] Date of Patent: Mar. 24, 1998

[54] SNOWMOBILE SUSPENSION SYSTEM

[75] Inventor: Masao Furusawa, Iwata, Japan

[73] Assignee: Yamaha Hatsudoki Kabushiki Kaisha, Iwata, Japan

[21] Appl. No.: 538,912

[22] Filed: Oct. 4, 1995

[30] Foreign Application Priority Data

Jan. 31, 1995 [JP] Japan .................... 7-013669

[51] Int. Cl.⁶ ............................................. B62M 27/02
[52] U.S. Cl. ................................ 180/193; 180/190
[58] Field of Search ........................ 180/182, 186, 180/190, 193; 305/127, 128, 131, 168

[56] References Cited

U.S. PATENT DOCUMENTS

| | | | |
|---|---|---|---|
| 3,773,126 | 11/1973 | Irvine | 180/193 |
| 3,913,694 | 10/1975 | Forsgren | 180/193 |
| 3,966,181 | 6/1976 | Lessard | 180/193 |
| 5,265,692 | 11/1993 | Mallette | 180/193 |
| 5,370,198 | 12/1994 | Karpik | 180/193 |

FOREIGN PATENT DOCUMENTS

| | | | |
|---|---|---|---|
| 172398 | 9/1952 | Austria | 180/190 |
| 62-214065 | 9/1987 | Japan . | |

*Primary Examiner*—Brian L. Johnson
*Assistant Examiner*—Frank Vanaman
*Attorney, Agent, or Firm*—Knobbe, Martens, Olson & Bear LLP

[57] ABSTRACT

A drive belt suspension for a snowmobile which permits the front and rear of the drive track to move independent of each other and load respective front and rear suspension means until a predetermined degree of travel has occurred. Thereafter, both suspension systems are loaded upon continued movement so as to provide an increase in rate of the suspension system to prevent bottoming.

8 Claims, 5 Drawing Sheets

SNOWMOBILE SUSPENSION SYSTEM

BACKGROUND OF THE INVENTION

This invention relates to a snowmobile suspension system and more particularly to an improved suspension system for the drive belt of a snowmobile.

As is well know, most snowmobiles, particularly larger machines, provide an arrangement wherein the drive belt is suspended for suspension movement relative to the body by a pair of shock absorber and spring arrangements. One of these is positioned at the front of the drive belt, and the other is positioned at the rear of the drive belt. These suspension assemblies operate between the guide rails of the drive belt and the body for dampening suspension movement. They also operate relatively independently of each other so that the drive belt may follow uneven terrains.

It is, of course, important to ensure that the hydraulic shock absorber is protected from bottoming out, either when the suspension system is compressed or at its fully expanded state. Therefore, it has been the practice to utilize relatively stiff springs so as to ensure that the shock absorbers will not be damaged by such bottoming out action.

The use of stiff springs, however, results in a rough ride and can, at times, deteriorate handling. Lighter rate springs can be utilized if the springs are both loaded at the same time. However, this in and of itself will then provide a stiffer action. In addition, there is a desirability of maintaining some degree of independence of the front and rear suspension so as to permit the belt to more fully conform to irregular terrains as aforenoted.

It is, therefore, a principal objection of this invention to provide an improved drive belt suspension system for a snowmobile.

It is a further object of this invention to provide a snowmobile drive belt suspension system that will offer the effect of a variable rate so that smaller suspension movements can be dampened by a soft spring arrangement, while extreme movements are resisted by a higher rate spring arrangement.

It is a further object of this invention to provide an improved snowmobile suspension arrangement wherein the drive belt can comply with varying terrains and yet wherein the suspension will offer an inherent increase in rate under large travels to permit smooth ride and reduce the likelihood of damage to the components.

SUMMARY OF THE INVENTION

This invention is particularly adapted for use in the suspension system for the drive belt of a snowmobile. The drive belt travels over a guide rail assembly. A first, forward suspension system suspends the forward part of the guide rail assembly relative to the body of the snowmobile. A second, rear suspension system suspends the rear portion of the drive belt relative to the body of the snowmobile assembly. These suspension systems each include hydraulic shock absorbers and associated springs. In addition, front and rear linkage systems are interposed between the body, guide rails and suspension elements for loading the suspension elements and controlling the relative movement between the guide rails and the body. Control means function to provide independent movement of the two suspension elements until a predetermined degree of relative movement occurs. After this, the front and rear suspension systems will both be loaded on continued suspension movement.

DETAILED DESCRIPTION OF THE PREFERRED EMBODIMENT

Figure 1:
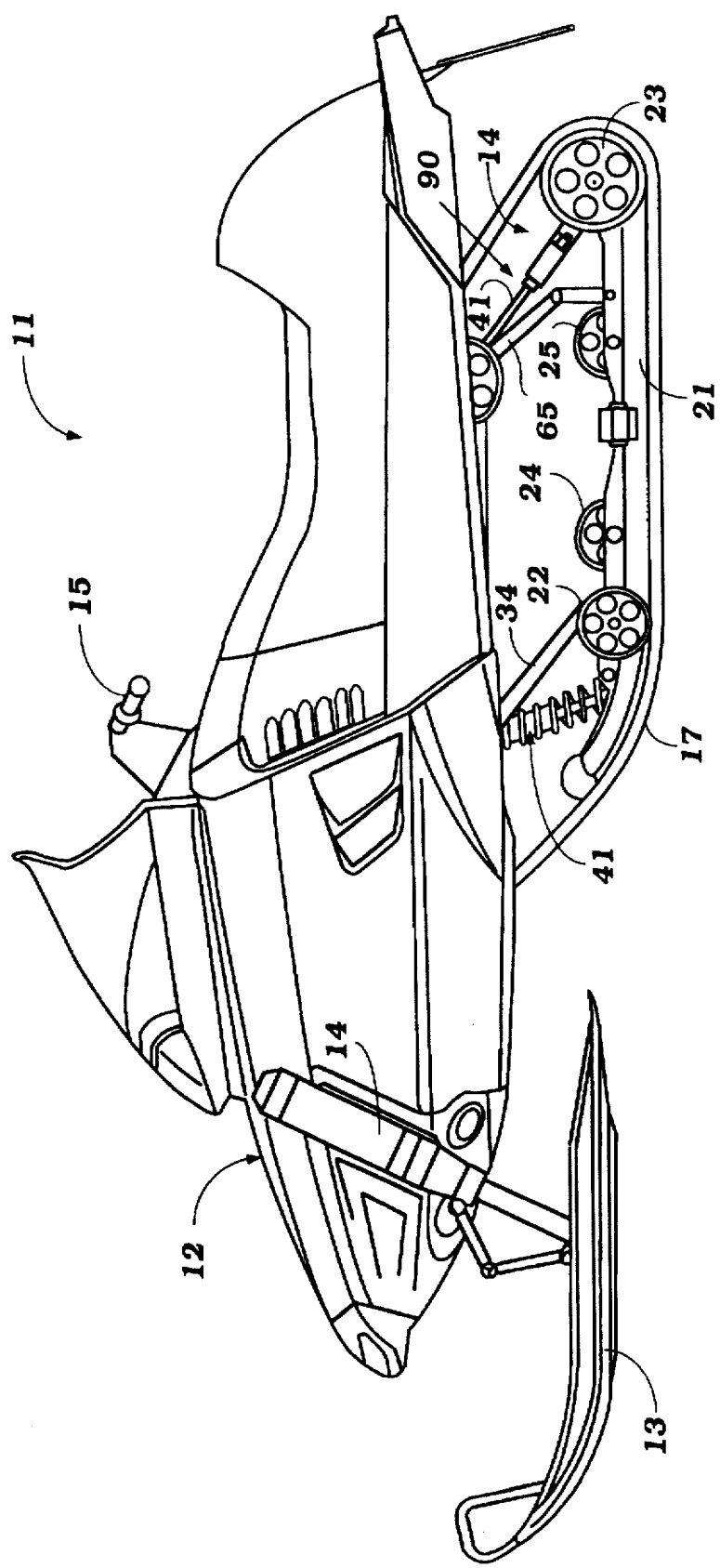
FIG. 1 is a side elevational view of a snowmobile constructed in accordance with an embodiment of the invention.

A snowmobile embodying a suspension system for the drive belt in accordance with this invention is identified generally by the reference numeral 11. The snowmobile 11 has a body assembly, indicated generally by the reference numeral 12. The body assembly 12 may be of any known construction and when it is referred herein as a "body", it is to be understood that this term is intended to encompass a frame, or the elements of the body itself.

A pair of front skis 13 are suspended by means of a suspension system 14, which may be of any known type, and are operatively coupled for steering movement to a handlebar assembly 15 in any known manner.

The snowmobile 11 includes an engine (not shown) which drives a continuously variable transmission (not shown) having an output sprocket 16 which, in turn, drives a drive belt 17 in a known manner.

The drive belt 17 is suspended relative to the body 12 by means of a front suspension system, indicated generally by the reference number 18, and a rear suspension system, indicated generally by the reference numeral 19. The front and rear suspension systems 18 and 19 are connected to a pair of spaced guide rails 21 which, in turn, back up the drive belt 17 in a known manner. The guide rails 21 carry a first pair of spaced rollers 22 that are carried by the guide rails 21 and coupled to the front suspension system 18 and which engage the drive belt 17. In a like manner, a series of spaced guide rollers 23 are carried by the rear portion of the guide rails 21 and engage the rear portion of the drive belt 17. The guide rails 21 also carry two additional pairs of spaced rollers 24 and 25 respectively which engage the drive belt 17 in spaced relationship to the guide rails 21.

Figure 2:
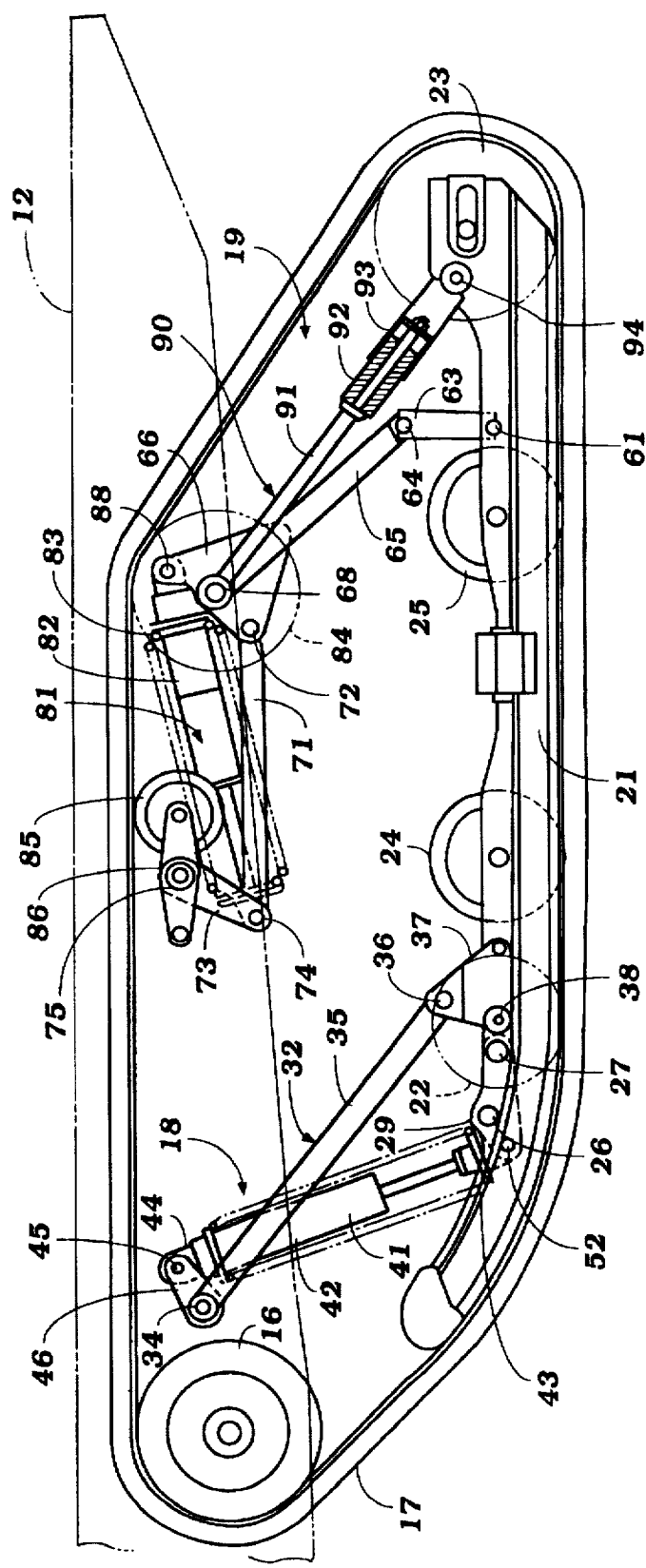
FIG. 2 is an enlarged side elevational view of the drive belt suspension system of the snowmobile in the fully extended condition.
Figure 3:
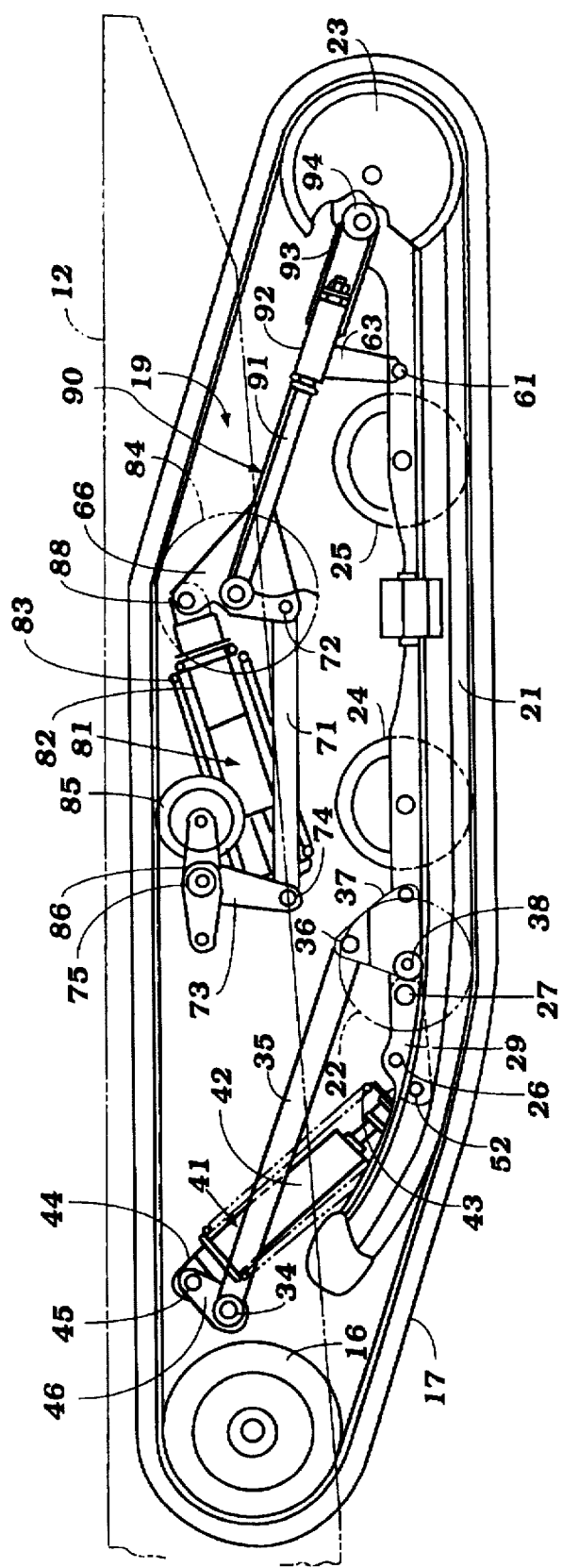
FIG. 3 is an enlarged side elevational view of the drive belt suspension system of the snowmobile in the fully compressed state.
Figure 4:
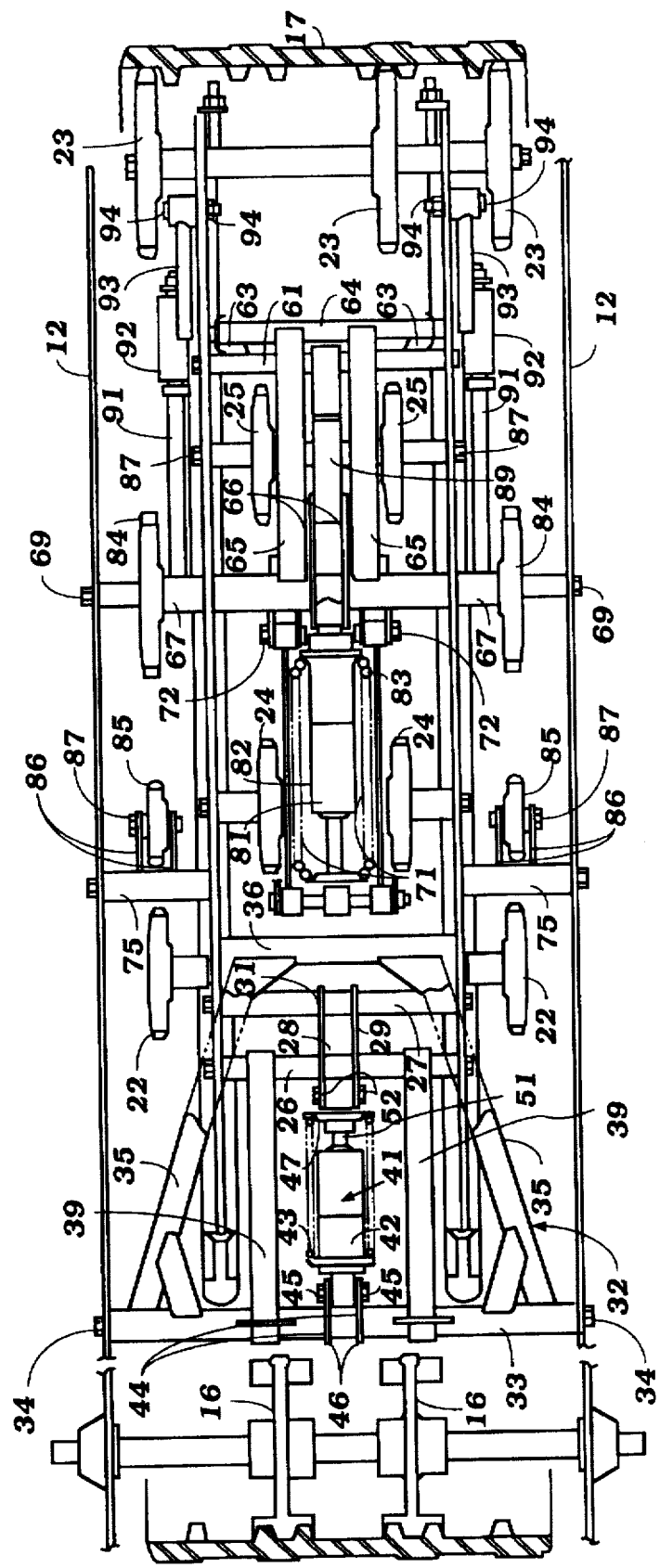
FIG. 4 is a top view of the drive belt suspension system of the snowmobile with portions broken away.

Referring to the front suspension system 18, which is shown in most detail in FIGS. 2, 3, and 4 the guide rails 21 carry two tubes, 26 and 27 respectively which are a portion of a weldment that comprises what may be considered to be a bracket assembly 28. This bracket assembly 28 includes a pair of bracket-like members 29 and 31 respectively that are rigidly connected as by welding to tubes 26 and 27 for translational and rotational movement with it and which, as will become apparent, act as bellcranks.

The front suspension 18 also includes a fabricated "A" suspension arm assembly 32 consisting of a cross tube 33 that is pivotally supported in any suitable manner on the body 12, by means which may include the bolts 34. A pair of depending lever portions 35 are each rigidly connected at their forward ends to the cross tube 33, as by welding. The rearward end of each of the lever portions 35 are also welded to a rearward cross tube 36 which, in turn, is pivotally connected at both ends to two linkage brackets 37. These linkage brackets 37 are pivotally connected to the guide rails 21 by means of a nut and bolt assembly 38.

A pair of straps 39 are also mounted between the cross tube 32 and tube 26 to restrict the maximum spacing range between the body 12 and the side rails 21.

The motion of tubes 26 and 27 is employed to load a suspension element, indicated generally by the reference number 41. The suspension element 41 in the illustrated embodiment includes a tubular shock absorber 42 and a surrounding coil spring 43. The upper end of the spring shock absorber element 41 has a mounting portion 44 that is pivotally connected by means of a bolt and nut assembly 45 to a trunion 46 that is affixed to and rotates with the tube 33.

The lower end of the spring shock absorber element 41 includes a piston rod 51 that is rigidly connected to a mounting portion 47 which, in turn, is pivotally connected between the leading arms of the brackets 29 and 31 by means of a bolt and nut assembly 52.

When the front portion of the drive belt 17 engages an obstruction, the guide rails 21 will be urged upward relative to the snowmobile body 12. As a result, the two linkage brackets 37 will also move upwards causing the suspension arm assembly 32 to pivot in a counterclockwise direction about the bolt assembly 34 which, in turn, pivots the trunion 46 in a counterclockwise direction about the bolt assembly 34. This pivoting motion causes the trunion 46 to exert a force on the upper mounting portion of the shock absorber 44 through the nut and bolt assembly 45 which tends to extend the suspension element 41.

At the same time, the bracket like members 29 and 31 will also move upwards, thereby forcing the lower mounting portion of the suspension element 47 upwards, thus compressing the shock. This movement is greater than that of the upper portion of the upper mounting portion. The compact assembly permits the suspension unit to be located within the drive belt 17 and still have a smooth ride with low hysteresis.

Considering now the rear suspension system 19 (FIGS. 2, 3, and 4), a tube 61 spans upstanding legs of the guide rails 21 and is journaled therein by means including bolts 62. A welded lever assembly consisting of a pair of arms 63 is affixed to the tube 61 and extends generally upwards therefrom. The arms 63 are pivotally connected at their upper ends by means of a tube 64 to which lever arms 65 are rigidly connected at their rearward end as by welding. The forward ends of lever arms 65 are rigidly connected to bellcranks 66 which, in turn, are rigidly connected to tube 67. Tube 67 is pivotally connected to an axle 68 which, in turn, is rigidly to fixed to the snowmobile body 12 by means of a nut and bolt assembly 69.

The portion of the bellcranks 66 forward of the axle 68 are pivotally connected to respective of a pair of links 71 by means of pivot pins 72. The forward ends of the links 71 are pivotally connected to levers 73 by means of bolts or the like 74. The levers 73 are, in turn, pivotally supported relative to the snowmobile body 12 by means of a shaft 75.

The levers 73 are employed to load one end of a suspension element indicated generally by the reference number 81. The suspension element 81 consists of a hydraulic shock absorber 82 and surrounding spring 83. This loading is accomplished through the bolt 74 which is connected to the cylinder of the suspension element 81 in a known manner.

Also affixed to the bellcranks 66 are further upper portions of an assembly employed to load both ends of the suspension element 81. For this purpose the upper portion of each bellcrank 66 is connected in a known manner to the opposite end of the suspension element 81 by means including a bolt 88.

Guide rollers 84 are carried on the axle 68 for engagement with the drive belt 17. In a similar manner guide rollers 85 are rotatably connected to lever arms 86 by means which include the bolts 87. The lever arms 86, in turn, are rigidly connected to the shaft 75.

Affixed to tube 67 is strap 89, its lower end being mounted to the tube 61 in order to restrict the maximum spacing range between the body 12 and the side rails 21.

When the rear portion of the drive belt 17 engages an obstruction, the guide rails 21 will be urged upward relative to the snowmobile body 12. As a result, the links 63 will load the lever arm 65 and cause the bellcranks 66 to pivot in a counterclockwise direction about the axle 68 as viewed in FIGS. 2 and 3. This pivotal movement will cause the links 71 to be drawn rearwardly and pivot the levers 73 also in a counterclockwise direction about shaft 75. As a result of this movement, the spring 83 and rod of the shock absorber unit 82 will be urged to the right.

At the same time the upper portion of the bellcrank assemblies will pivot in a counterclockwise direction about the axle 68 and this motion is transmitted through the bolt 87 to cause the right-hand side of the spring 83 and the cylinder unit of the shock absorber 82 to be moved to the left. Thus, the amount of suspension travel is amplified at the suspension element 81 so as to provide in effect a greater rate of travel than would be possible if only one end of the suspension element were moved when a load was encountered. This provides an arrangement whereby less linkage is employed, a compact assembly results and unsprung weight is reduced. The linkage arrangement employed also reduces the amount of suspension loading which must be borne by the body and, thus, permits a lighter weight construction to be employed. Furthermore, a relatively simple linkage system is employed to achieve these results and which permit, if desired, a progressive spring rate with the use of low hysteresis type spring, such as the coil spring employed.

From the construction is thus far described, it should be readily apparent that the front suspension system 17 and the rear suspension system 18 operate substantially independently of each other. As a result of this, with conventional constructions of this general type, it is necessary to use relatively stiff springs for the springs 43 and 83 of the front and rear suspension units. This is to ensure that the suspension will not bottom out and cause damage to the shock absorbers 42 and/or 82. This results in harsh ride and the difficulties aforenoted.

Therefore, and in accordance with the invention, there is provided a control means which functions to permit this degree of independent movement of the front and rear suspension systems 17 and 18 for a finite amount of travel. Thereafter, the control means functions to load both of the suspension systems 18 and 19 upon continued travel thus providing a significant increase in rate and stiffness of the overall suspension system. This provides, in effect, a variable rate spring assembly for the total suspension system.

This control means is comprised of a telescopic links 90 that include control bars 91 that are rotatable connected at their forward ends to tube 67 and slidably supported at their rearward ends within sleeves 92. The sleeves 92 are rigidly connected to tubular members 93 which, in turn, are pivotally connected to the rails 21 by means of a nut and bolt assembly 94.

Considering now in more detail the connection between control bars 91 and sleeves 92, it is such that the control bars 91 and sleeves 92 may move relative to each other in either direction from a neutral position for a finite degree. Thereafter, the mechanism stops and the control levers 90 operate as fixed links and the linkage system, therefore, operates as a parallelogram linkage system so that both of the suspension units 18 and 19 are loaded uniformly.

In the embodiment shown in FIGS. 1 through 4, the control bar 91 carries a pair of stops 95 and 96, each of which is adapted to engage a respective end of the sleeve 92 for controlling the degree of relative movement in both the upward track movement and in the downward track movement. Once these stops engage the sleeve 92, the suspension systems 18 and 19 will no longer operate independently. The stops 95 and 96 may be adjustable in position or shims may be utilized for adjustment purposes.

Figure 5:
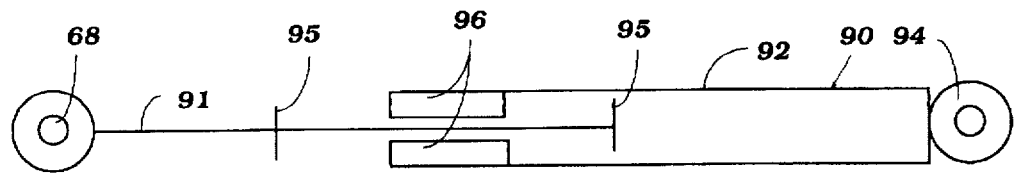
FIG. 5 is an enlarged cross-sectional view of an embodiment of the invention.

FIG. 5 is an enlarged view showing the actual construction of the control link 90 of the embodiment of FIGS. 1 through 4. As shown in FIG. 5, the control bar 91 is permitted to translate a predetermined distance into and out of the sleeve 92 before being rigidly constrained when either step 95 contacts the respective end of the sleeve 92. If desired this configuration may be modified in such a way as to change the degree of movement of the control bar 91 relative to the sleeve 92 by either lengthening or shortening the sleeve 92 or by repositioning the stops 95 in a manner such as to achieve the desired operation of the system.

It should be readily apparent that continued upward motion of the rear portion of the drive belt 17 relative to the body 12 will cause the lever arms 65 and bellcranks 66 to pivot in a counterclockwise direction to such an extent as to cause inboard motion of the control arms 91 relative to the sleeves 92 until such time as when a stop 95 rigidly connects the control arms 91 to the sleeves 92. With this situation in effect further upward motion of the rear portion of the drive belt 17 is communicated to the front suspension system 18 so as to load the front suspension element 41 in the manner previously described. Thus, for large deflections at the rear portion of the drive belt 17 both front and rear suspension elements are activated, which permits the use of softer springs in the suspension elements 41 and 81 than would otherwise be possible. This greatly improves the comfort level of the vehicle since the softer springs will furnish a more compliant ride than would the harder springs normally necessary to adequately suspend the vehicle in situations where the rear portion of the drive belt 17 undergoes a large displacement relative to the snowmobile body 12.

In the embodiment thus far described, the telescopic motion continues for a predetermined degree in either direction until there is a rigid engagement between the stops 95 and 96 and the ends of the sleeve 92. If desired, various resilient stop mechanisms may be employed so as to render the transition from the softer to the harder spring rate more gradual. For example, FIG. 6 describes another embodiment of the invention where springs 101 have been inserted between the stops 95 and the retainer 96 in order to more gradually inhibit relative motion and improve the loading between the control bar 91 and the sleeve 92. These springs may be hard or soft, or a combination thereof, if desired. Or, only one spring 101 may be inserted instead of two such as to resist motion in one direction only, leaving motion in the opposite direction unimpeded until such time as the stop 95 contacts the retainer 96.

Figure 6:
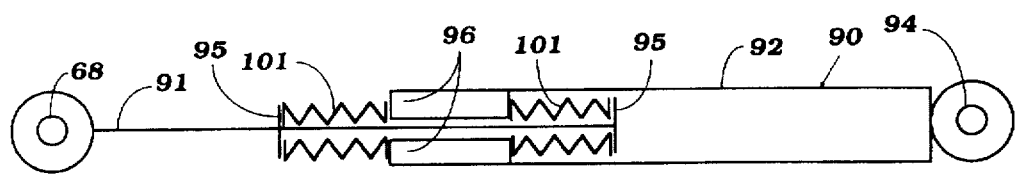
FIG. 6 is an enlarged cross-sectional view, in part similar to FIG. 5, and shows another embodiment of the invention.
Figure 7:
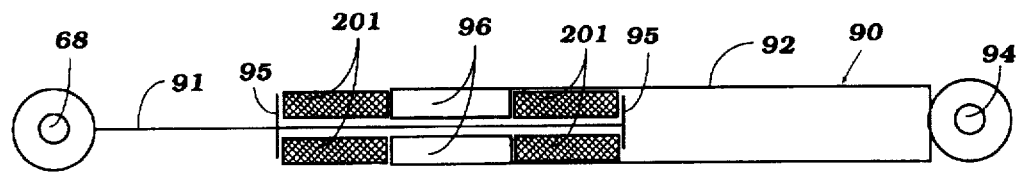
FIG. 7 is an enlarged cross-sectional view, in part similar to FIG. 5, and shows yet another embodiment of the invention.

FIG. 7 illustrates a further improvement of the FIG. 6 functionality. Elastomeric elements 201 replace the springs 101 mounted between the stops 95 and the retainer 96, thus adding damping behavior to the system. It should be noted that the spring and damping properties of the elastomeric elements 201 may be varied as desired or only one elastomeric element 201 may be inserted such as to resist motion in one direction only.

Figure 8:
FIG. 8 is an enlarged cross-sectional view, in part similar to FIG. 5, and shows still another embodiment of the invention.

FIG. 8 illustrates a different manner by which the control arms 91 and sleeves 92 function so as to communicate motion of the rear portion of the drive belt 17 to the front suspension element 41. In this embodiment the control arms 91 are rigidly connected to the sleeves 92 such that they form a direct link from the tube 67 to the pivot on the lower end of the lever arms 93. Elastomeric elements 301 are positioned at the pivot joints between the tube 67 and the axle 68 and between the lever arms 93 and the nut and bolt assembly 94 in order to provide spring and damping resistance to any relative motion between the rear portion of the drive belt 17 and the snowmobile body 12. The spring and damping properties of the elastomeric elements 301 may be varied as desired, or an elastomeric element 301 need not necessarily be inserted at both of the described locations. Needless to say, the elastomeric elements 301 may also be used in conjunction with any of the embodiments illustrated in FIGS. 5, 6, and 7.

It is to be understood that both front and rear suspension units have been described for the same drive belt. However, it is possible to employ either of the suspension units without the other or with different types of suspension units. Various other changes and modifications may be made without departing from the spirit and scope of the invention, as defined by the appended claims.

What is claimed is:

1. A snowmobile having a body, a drive track, a guide rail, and suspension means for suspending said guide rail for movement relative to said body comprised of a front suspension system for suspending a forward part of said guide rail for movement relative to said body and comprising a first shock absorber and spring and a first linkage system for loading said first shock absorber and spring upon relative movement of said guide rail and said body, a rear suspension system for suspending a rearward part of said guide rail for movement relative to said body and comprised of a second shock absorber and spring and a second linkage system for loading said second shock absorber and spring upon relative movement of said guide rail and said body, one of said linkage systems including a link having a fixed pivotal connection to said body and a fixed pivotal connection to said guide rail, the other of said linkage systems including a telescopic link having a first pivotal connection to the body and a second pivotal connection to the guide rail for permitting said front and said rear suspension systems to operate substantially independently of each other during a first degree of vertical movement of said guide rail relative to said body guide rail and said body and thereafter acts as a rigid link whereby the linkage systems function as a parallelogram linkage system between said guide rail and said body.

2. The snowmobile as set forth in claim 1, wherein the telescopic link permits substantially unrestricted vertical movement for a first degree of relative vertical movement between the drive track and the body and thereafter provides a resiliently cushioned degree of relative vertical movement for a predetermined amount.

3. The snowmobile as set forth in claim 2, wherein the resiliently cushioned relative vertical movement is accommodated by a spring.

4. The snowmobile as set forth in claim 2, wherein the resiliently cushioned relative vertical movement is provided by an elastomeric element.

5. The snowmobile as set forth in claim 2, wherein the telescopic link permits an unrestricted first degree of relative vertical movement between the drive track and the body in either direction from a neutral position and thereafter provides resiliently cushioned relative vertical movement for a predetermined degree.

6. The snowmobile as set forth in claim 5, wherein the resiliently cushioned relative movement is accommodated by a spring.

7. The snowmobile as set forth in claim 5, wherein the resiliently cushioned relative movement is provided by an elastomeric element.

8. The snowmobile as set forth in claim 1, wherein the pivotal connection between the telescopic link and the body is coincident with a pivotal connection between a link of the other linkage system and the body and wherein the telescopic link is juxtaposed to said other linkage system.

* * * * *